(12) United States Patent
Tateyama et al.

(10) Patent No.: US 9,011,747 B2
(45) Date of Patent: Apr. 21, 2015

(54) METHOD FOR MANUFACTURING FIBER-REINFORCED PLASTIC

(75) Inventors: Masaru Tateyama, Nagoya (JP); Takafumi Hashimoto, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/125,207

(22) PCT Filed: May 31, 2012

(86) PCT No.: PCT/JP2012/064023
§ 371 (c)(1),
(2), (4) Date: Dec. 10, 2013

(87) PCT Pub. No.: WO2012/172982
PCT Pub. Date: Dec. 20, 2012

(65) Prior Publication Data
US 2014/0124976 A1    May 8, 2014

(30) Foreign Application Priority Data

Jun. 16, 2011 (JP) ................................ 2011-134451
Jul. 5, 2011 (JP) ................................ 2011-148952

(51) Int. Cl.
| | |
|---|---|
| *B29C 43/18* | (2006.01) |
| *B29C 45/00* | (2006.01) |
| *B29C 43/34* | (2006.01) |
| *B29C 70/48* | (2006.01) |
| *B29C 70/12* | (2006.01) |
| *B29C 45/14* | (2006.01) |
| *B29C 45/56* | (2006.01) |

(52) U.S. Cl.
CPC ............ *B29C 45/0005* (2013.01); *B29C 43/18* (2013.01); *B29C 43/34* (2013.01); *B29C 45/14786* (2013.01); *B29C 70/48* (2013.01); *B29C 2045/564* (2013.01); *B29C 70/12* (2013.01)

(58) Field of Classification Search
USPC ......................................................... 264/257
See application file for complete search history.

(56) References Cited

U.S. PATENT DOCUMENTS

| | | | | |
|---|---|---|---|---|
| 5,275,776 A | * | 1/1994 | Hara et al. .................... 264/257 |
| 2011/0241250 A1 | * | 10/2011 | Horizono et al. ............. 264/258 |

FOREIGN PATENT DOCUMENTS

| | | |
|---|---|---|
| JP | 03-261519 A | 11/1991 |
| JP | 08-174689 A | 7/1996 |
| JP | 2003-159735 A | 6/2003 |
| JP | 2003-211500 A | 7/2003 |
| JP | 2010-037358 A | 2/2010 |
| JP | 2010-235779 A | 10/2010 |
| JP | 2011-031481 A | 2/2011 |

* cited by examiner

*Primary Examiner* — Jacob Thomas Minskey
(74) *Attorney, Agent, or Firm* — DLA Piper LLP (US)

(57) ABSTRACT

A method of manufacturing a fiber-reinforced plastic includes placing a compressible reinforcing fiber base material made of discontinuous reinforcing fibers in a cavity of a mold, injecting melted thermoplastic resin into the cavity, and impregnating the resin into the reinforcing fiber base material, wherein the mold is adapted to change a cavity volume of the mold, and the reinforcing fiber base material after having been or while being impregnated with the thermoplastic resin is compressed in the cavity by reducing the cavity volume of the mold after injecting the melted thermoplastic resin.

18 Claims, 4 Drawing Sheets

METHOD FOR MANUFACTURING FIBER-REINFORCED PLASTIC

TECHNICAL FIELD

This disclosure relates to a method of manufacturing a fiber-reinforced plastic and, specifically, to a method of manufacturing a fiber-reinforced plastic capable of molding a fiber-reinforced plastic having high mechanical properties easily and inexpensively even if it has a complicated shape.

BACKGROUND

A fiber-reinforced plastic made of reinforcing fibers and a matrix resin, also referred to as "FRP," in particular, a carbon fiber-reinforced plastic made of carbon fibers and a matrix resin, also referred to as "CFRP," is developed broadly in various uses, because of its excellent mechanical properties, property light in weight, corrosion resistance and the like. As a method of manufacturing an FRP, although there is a method using a so-called "prepreg" which is impregnated with a resin in advance, in a case where it is required to broaden the range of the moldable shape of FRP and to shorten the time required for molding, for example, in a case where a mass production is required such as in parts for vehicles or parts for electronic equipment, a method is frequently employed wherein a reinforcing fiber base material (dry-type reinforcing fiber base material) substantially containing no resin is formed in a predetermined shape, and by impregnating a matrix resin thereinto, a desired FRP is molded.

In such a molding of FRP, in a case where a thermosetting resin is used as the matrix resin, because the viscosity of the thermosetting resin before being cured is low, the resin can be cured after it is impregnated into a reinforcing fiber base material in a mold. In this method, there is an advantage that an expensive autoclave is not required and the time for molding may be relatively short.

On the other hand, to mold an FRP having a more complicated shape, in particular, to conform it also to a mass-production article, it is preferred to use a thermoplastic resin better in moldability as the matrix resin. However, because a thermoplastic resin is generally high in viscosity at the time of being melted as compared to a thermosetting resin, it is frequently difficult to impregnate a melted resin into a reinforcing fiber base material in a short period of time, and it has been difficult to manufacture an FRP with a high productivity by a molding method wherein a resin is impregnated into a reinforcing fiber base material in a mold.

To use a thermoplastic resin as a matrix resin and impregnate it into a reinforcing fiber base material at a relatively good condition, a reinforcing fiber base material is formed in a non-woven fabric-like form by using discontinuous reinforcing fibers, thereby making the porosity of the base material high and facilitating impregnation of the resin having a high viscosity. However, even in such a reinforcing fiber base material having a high porosity, it is not easy to impregnate a thermoplastic resin thereinto, and only a method has been known wherein a matrix resin is once formed in a sheet-like shape such as a non-woven fabric and it is pressed while being heated at a condition of being stacked with a reinforcing fiber base material (for example, JP-A-2010-037358 and JP-A-2010-235779). Even if such a reinforcing fiber base material having a high porosity is placed in a mold for injection molding and a thermoplastic resin is injected, only a CFRP having a very low fiber content or having many pores (voids) has been able to be obtained.

Accordingly, it could be helpful to provide a method of manufacturing a fiber-reinforced plastic which can mold a fiber-reinforced plastic having high mechanical properties easily and inexpensively even if it has a complicated shape.

SUMMARY

We thus provide:

(1) A method of manufacturing a fiber-reinforced plastic including placing a compressible reinforcing fiber base material made of discontinuous reinforcing fibers in a cavity of a mold, injecting melted thermoplastic rein into the cavity, and impregnating the resin into the reinforcing fiber base material, wherein the mold is adapted to change a cavity volume of the mold, and the reinforcing fiber base material after having been or while being impregnated with the thermoplastic rein is compressed in the cavity by reducing the cavity volume of the mold after injecting the melted thermoplastic resin.

(2) The method according to item (1), wherein, after injecting the melted thermoplastic resin into the cavity of the mold at a condition where the mold is opened in advance, the cavity volume of the mold is reduced by closing the mold.

(3) The method according to item (1), wherein, after placing the reinforcing fiber base material in the cavity of the mold and closing the mold, the cavity volume is reduced after the mold is opened by a resin pressure at which the melted thermoplastic resin is injected into the cavity.

(4) The method according to items (1) to (3), wherein a compression force at the time of reducing the cavity volume is 10 MPa or more.

(5) The method according to items (1) to (4), wherein a mold, mold pieces disposed facing each other of which can be closed and opened via a fitting structure or a movable core, is the mold adapted to change the cavity volume.

(6) The method according to items (1) to (5), wherein the cavity volume is reduced after the melted thermoplastic resin is injected at a condition where a pressure in the cavity is reduced.

(7) The method according to items (1) to (6), wherein a base material, an apparent porosity of which at the time of being compressed at 2 MPa is 70% or more, is used as the compressible reinforcing fiber base material.

(8) The method according to items (1) to (7), wherein a base material, an apparent porosity of which at the time of being compressed at 10 MPa is 40% or less, is used as the compressible reinforcing fiber base material.

(9) The method according to items (1) to (8), wherein reinforcing fibers of the reinforcing fiber base material comprise carbon fibers.

(10) The method according to item (9), wherein a weight average fiber length of the carbon fibers contained in the reinforcing fiber base material is 1 mm or more and 100 mm or less.

(11) The method according to items (1) to (10), wherein a thermoplastic resin is contained in the reinforcing fiber base material by 3 to 50 wt. %.

(12) The method according to items (1) to (11), wherein the reinforcing fiber base material is one made by paper making method.

(13) The method according to items (1) to (11), wherein the reinforcing fiber base material is one made by a carding machine.

(14) The method according to items (1) to (13), wherein the reinforcing fiber base material is one in which the discontinuous reinforcing fibers are randomly oriented.

(15) The method according to items (1) to (13), wherein the reinforcing fiber base material is one in which at least a part of the discontinuous reinforcing fibers are oriented in a specified direction.

(16) The method according to item (15), wherein a ratio of an elastic modulus in the specified direction to an elastic modulus in a direction perpendicular to the specified direction of a fiber-reinforced plastic after molding is 2:1 to 10:1.

(17) The method according to items (1) to (16), wherein a molding temperature of the thermoplastic resin is 100° C. or higher.

(18) The method according to items (1) to (17), wherein the thermoplastic resin includes one selected from the group consisting of a polyolefin, a polyamide, a polyester, a polyphenylene sulfide, a polycarbonate, a polyetherketone and a polyetherimide.

(19) The method according to items (1) to (18), wherein, as the mold, a mold for injection-compression molding, in which a gas vent is provided to a cavity part positioned at an opposite side relatively to a gate filled with the thermoplastic resin, is used.

(20) The method according to items (1) to (19), wherein a base material, in which the compressible reinforcing fiber base material is held in a resin film pack at a pressure reduced condition, is placed in the cavity of the mold.

Thus, a fiber-reinforced plastic having high mechanical properties can be molded easily and inexpensively even if it has a complicated shape.

EXPLANATION OF SYMBOLS 1, 21: mold
2, 3, 22, 23: mold piece
4: fitting structure
5, 24: cavity
6, 11, 27: reinforcing fiber base material
7, 31: thermoplastic resin
8, 12, 32: fiber-reinforced plastic
25: movable core
26: driving means
28: valve
29: suction path
30: seal material
41: carding machine
42: cylinder roll
43: take-in roll
44: doffer roll
45: worker roll
46: stripper roll
47: feed roll
48: belt conveyer
49: discontinuous carbon fibers
50: sheet-like web

DETAILED DESCRIPTION

Our method of manufacturing a fiber-reinforced plastic comprises steps of placing a compressible reinforcing fiber base material made of discontinuous reinforcing fibers in a cavity of a mold, injecting melted thermoplastic resin into the cavity, and impregnating it into the reinforcing fiber base material. The mold is configured as one capable of changing a cavity volume of the mold, and the reinforcing fiber base material after having been or while being impregnated with the thermoplastic resin is compressed in the cavity by reducing the cavity volume of the mold after injecting the melted thermoplastic resin.

In such a method of manufacturing a fiber-reinforced plastic, because the reinforcing fiber base material is made of discontinuous reinforcing fibers, it is formed as a base material the porosity of which is high as compared to that of a dense woven fabric base material and the like and which can be impregnated with a melted thermoplastic resin with a high viscosity relatively easily. Therefore, with respect to only this reinforcing fiber base material, it has a good resin impregnation ability and exhibits an excellent moldability from this point of view. However, merely by impregnating the high-viscosity thermoplastic resin into this reinforcing fiber base material, as aforementioned, because the fiber volume content of the reinforcing fibers becomes low, and desirable high mechanical properties cannot be obtained or voids in an FRP increase when the FRP is molded, an FRP having a good quality can be hardly obtained. Accordingly, when such a reinforcing fiber base material having a good resin impregnation ability is placed in a cavity of a mold and the melted thermoplastic resin is injected into the mold after the mold is heated, for example, before or after the reinforcing fiber base material is placed in the mold, the mold has been configured as one capable of changing the cavity volume, and after the melted thermoplastic resin is injected into the cavity of the mold, the cavity volume of the mold is reduced mechanically. Then, by this reduction of the cavity volume of the mold, the above-described reinforcing fiber base material having been or being impregnated with the thermoplastic resin is compressed in the cavity.

By this compression of the reinforcing fiber base material in the cavity, its apparent porosity is made smaller, the fiber volume content of an FRP to be molded is made higher, and high mechanical properties as the FRP can be realized. Further, at the same time, by the condition where the apparent porosity of the reinforcing fiber base material is made smaller, voids being enclosed in the base material are pushed out or suppressed to be very small, thereby ensuring a good quality of an FRP after molding. Concretely, for example, by forming a space in the cavity at the stage of placing the reinforcing fiber base material in the cavity and injecting the melted thermoplastic resin into this space, the resin is easily filled in the space, and by pressing substantially after such filling, the resin can be quickly impregnated into the base material with the high porosity from the entire surface of the reinforcing fiber base material facing the space at a small distance for impregnation.

As well as that, because the reinforcing fiber base material is also compressed by such pressing, the fiber volume content is increased, and high mechanical properties as FRP can be obtained. Furthermore, because the reinforcing fiber base material made of discontinuous reinforcing fibers, for example, formed as a non-woven fabric-like material, has excellent formability, it can be adapted to a complicated molding shape, and by using such a reinforcing fiber base material, a good moldability can be maintained. This good moldability is not damaged at all by the above-described compression in the mold after the reinforcing fiber base material is placed in the mold. Namely, while the good moldability is maintained, high mechanical properties and good quality as FRP can be easily ensured.

In the above-described method of manufacturing a fiber-reinforced plastic, reduction of the cavity volume of the mold can be carried out as follows. For example, after injecting the melted thermoplastic resin into the cavity of the mold at a condition where the mold is opened in advance, the cavity volume of the mold is reduced by closing the mold. Further, after placing the above-described reinforcing fiber base material in the cavity of the mold and closing the mold, the cavity volume may also be reduced after the mold is opened by a resin pressure at which the above-described melted thermoplastic resin is injected into the cavity. Even in any of the above-described methods, a thermoplastic resin can be impregnated easily and satisfactorily into the reinforcing fiber base material at a condition where the base material has a high apparent porosity and a good resin impregnation ability and the reinforcing fiber base material after having been or while being impregnated with the resin can be compressed in the mold, thereby enhancing the fiber volume content of an FRP to be molded and realizing high mechanical properties as the FRP.

Further, in the above-described reduction of the cavity volume of the mold, it is preferred that the compression force at the time of reducing the cavity volume is 10 MPa or more. Namely, because in the cavity the reinforcing fiber base material after having been or while being impregnated with the resin is to be compressed, to achieve a sufficiently low apparent porosity (sufficiently high fiber volume content) by compression, the compression force is preferably 10 MPa or more.

Further, as the above-described mold capable of changing the cavity volume, for example, a mold, mold pieces disposed facing each other of which can be closed and opened via a fitting structure or a movable core, can be used. Namely, in a mold having a fitting structure, the cavity volume can be reduced by operating the mold pieces, which are in an opening condition, in the mold closing direction to each other. In a mold equipped with a movable core, the cavity volume can be reduced by operating the movable core in a specified direction in the cavity. However, as long as it is a mold capable of changing its cavity volume, a mold having a structure other than those structures can be used.

Further, with respect to the above-described injection of the melted thermoplastic resin into the cavity, the melted thermoplastic resin can also be injected at a condition where the pressure in the cavity is reduced, and the cavity volume may be reduced after the resin injection. Because gas can be smoothly discharged from the reinforcing fiber base material by the pressure reduction, generation of voids due to gas can be further satisfactorily suppressed. Further, by injecting the melted thermoplastic resin in to the pressure-reduced cavity, it becomes possible to distribute the resin in the cavity more easily and uniformly.

Further, it is preferred that the reinforcing fiber base material has initial properties of a porosity as high as possible and an ability easily impregnated with a high-viscosity melted thermoplastic resin. On the other hand, it is preferred that, after the above-described predetermined compression in the mold, the porosity is suppressed as low as possible to achieve a high fiber volume content. From such a point of view, as the property of the above-described reinforcing fiber base material itself, it is preferred that the apparent porosity of the base material at the time of being compressed at 2 MPa (namely, at the time of being compressed at a small pressure to define the property of the base material itself quantitatively) is 70% or more. Further, it is preferred that the apparent porosity of the above-described reinforcing fiber base material at the time of being compressed at 10 MPa is 40% or less.

Further, although the kind of the reinforcing fibers of the above-described reinforcing fiber base material is not particularly restricted and carbon fibers, glass fibers, aramide fibers and the like and, further, reinforcing fibers with a hybrid structure combined by these fibers can be used to realize higher mechanical properties, it is preferred that the reinforcing fibers of the above-described reinforcing fiber base material comprise carbon fibers.

Further, in a case where the reinforcing fibers of the above-described reinforcing fiber base material comprise carbon fibers, to realize high mechanical properties, it is preferred that the weight average fiber length of carbon fibers contained in the reinforcing fiber base material is 1 mm or more. If the weight average fiber length is too short, the function as reinforcing fibers becomes poor, and an effect of enhancing the mechanical properties becomes small. Further, to maintain the aforementioned good moldability, it is preferred that the weight average fiber length of carbon fibers contained in the reinforcing fiber base material is 100 mm or less. If the weight average fiber length is too long, because they become close to continuous fibers, there is a fear that the formability of the base material and the moldability of FRP are lowered.

Further, it is possible to contain a thermoplastic resin in the reinforcing fiber base material by 3 to 50 wt. %. This thermoplastic resin mainly has a function of adhesion of holding a formation of the reinforcing fiber base material, and it is different from the function of a matrix resin for molding an FRP. However, the kind of the resin may be same as that of the matrix resin.

Further, to ensure good formability of the base material and ensure a good resin impregnation property into the base material, it is desired that the above-described reinforcing fiber base material made of discontinuous reinforcing fibers is formed in a formation of a nonwoven fabric. Such a desirable formation can be realized by the reinforcing fiber base material made by paper making method, or by the reinforcing fiber base material made by a carding machine.

Further, in particular, in a case where more excellent formability of the base material and molding of FRP into a more complicated shape are required, the above-described reinforcing fiber base material is formed preferably as a formation in which the discontinuous reinforcing fibers are randomly oriented. On the other hand, in a case where high mechanical properties in a specified direction are desired to be exhibited in an FRP to be molded, the above-described reinforcing fiber base material is formed preferably as a formation in which at least a part of the discontinuous reinforcing fibers are oriented in a specified direction. It can be realized also by the above-described carding machine to thus orient at least a part of the discontinuous reinforcing fibers in a specified direction.

Further, in a case where at least a part of the discontinuous reinforcing fibers are oriented in a specified direction as described above, it is possible to control the ratio of an elastic modulus in the specified direction to an elastic modulus in a direction perpendicular to the specified direction of a fiber-reinforced plastic after molding, for example, to 2:1 to 10:1.

Further, although the kind of the above-described thermoplastic resin as the matrix resin impregnated into the above-described reinforcing fiber base material is not particularly restricted, its temperature of molding is preferably, for example, 100° C. or higher. For example, in a case where the mold is heated at a temperature of 100° C. or higher, it is particularly preferable that the temperature of molding the thermoplastic resin is 100° C. or higher.

As a thermoplastic resin, for example, one selected from the group consisting of a polyolefin, a polyamide, a polyester, a polyphenylene sulfide, a polycarbonate, a polyetherketone and a polyetherimide can be exemplified.

Further, as the above-described mold, a mold for injection-compression molding in which a gas vent is provided to a cavity part positioned at an opposite side relatively to a gate filled with the thermoplastic resin, can be used. If such a mold is used, when the melted thermoplastic resin is injected into the cavity of the mold, gas is adequately discharged through the gas vent as well as gas is adequately discharged also when the cavity volume of the mold is reduced, and it becomes possible to perform the compression molding more smoothly.

Further, a base material in which the above-described compressible reinforcing fiber base material is held in a resin film pack at a pressure reduced condition can also be used, and the base material with such a formation can be placed in the cavity of the mold. If the base material with such a formation is used, it becomes possible to maintain a desirable compressible condition of the reinforcing fiber base material also during handling, and it becomes possible to serve it to compression only when the compression is required.

Furthermore, although there is a case where reinforcing fibers exist at a fiber bundle condition in the above-described compressible reinforcing fiber base material, in such a case, if the rate of the fiber bundles in the reinforcing fiber base material becomes too much, there is a fear that the flowability of the resin containing the reinforcing fibers at the time of compression molding is damaged. Therefore, in the compressible reinforcing fiber base material, it is preferred to suppress the fiber bundles each having 50 to 1,000 reinforcing fibers at an amount of 80 wt. % or less relative to the whole of the compressible reinforcing fiber base material.

Hereinafter, more concrete examples of our methods will be explained.

For example, carbon fibers cut at a weight average fiber length of 50 mm are used as discontinuous reinforcing fibers, and the carbon fibers are supplied to a carding machine to make a compressible sheet-like carbon fiber base material. This base material sheet is placed, for example, in a cavity of a mold equipped in an injection press machine. After placing the base material, the mold is heated at a temperature of 100° C. or higher and, for example, a melted polyamide resin as a thermoplastic resin is injected into the cavity of the mold. Together with the injection or after the injection, although the inside of the mold is compressed by reducing the cavity volume of the mold, examples of the compression operation due to this reduction of the cavity volume of the mold will be described later referring to FIGS. 1 to 3.

Figure 4:
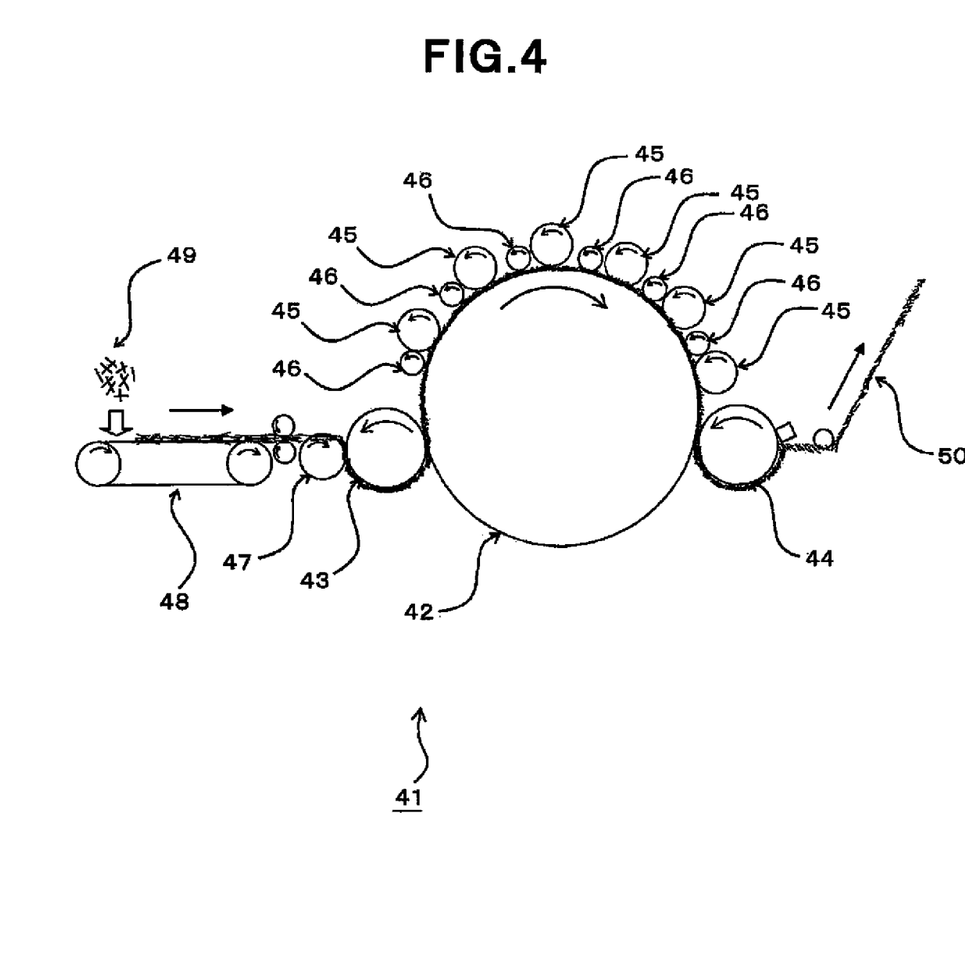
FIG. 4 is a schematic diagram in case where a reinforcing fiber base material is made by a carding machine.

The above-described making of the carbon fiber base material by a carding machine is carried out, for example, as follows. FIG. 4 shows a schematic diagram in case where a reinforcing fiber base material is made by a carding machine. A carding machine 1 shown in FIG. 4 mainly comprises a cylinder roll 42, a take-in roll 43 provided at an upstream side and closely to the outer circumferential surface of the cylinder roll 42, a doffer roll 44 provided closely to the outer circumferential surface of the cylinder roll 42 at a downstream side which is a side opposite the side of the take-in roll 43, a plurality of worker rolls 45 provided closely to the outer circumferential surface of the cylinder roll 42 between the take-in roll 43 and the doffer roll 44, stripper rolls 46 provided closely to the worker rolls 45, and a feed roll 47 provided closely to the take-in roll 43, and a belt conveyer 48.

Aggregates of discontinuous carbon fibers 49 which are cut, for example, at a weight average fiber length of 50 mm, are supplied onto belt conveyer 48, and the discontinuous carbon fibers 49 are introduced onto the outer circumferential surface of cylinder roll 42 through the outer circumferential surface of feed roll 47 and then through the outer circumferential surface of take-in roll 43. Up to this stage, discontinuous carbon fibers 49 become a floc-like form. Although a part of the floc-like carbon fibers introduced onto the outer circumferential surface of cylinder roll 42 wind around the outer circumferential surface of the respective worker rolls 45, these carbon fibers are stripped off by the respective stripper rolls 46 and returned again onto the outer circumferential surface of the cylinder roll 42. Many needles, projections exist at standing conditions on the outer circumferential surfaces of the respective rolls of feed roll 47, take-in roll 43, cylinder roll 42, worker rolls 45 and stripper rolls 46, and in the above-described steps, by the operation of the needles, carbon fibers are refined into a single-fiber condition and at the same time the directions of most of the carbon fibers are arranged in a specified direction, namely, in the rotational direction of cylinder roll 42. The refined carbon fibers promoted in fiber orientation through such steps, move onto the outer circumferential surface of doffer roll 44 as a sheet-like web 50 which is one form of a carbon fiber aggregate. Further, by drawing the web 50 while narrowing the width thereof to a predetermined width, a sheet-like base material made of discontinuous carbon fibers is formed.

In the carding as described above, although the aggregate of discontinuous carbon fibers 49 may be formed by only carbon fibers, the carding can also be performed at a condition mixed with discontinuous organic fibers, in particular, thermoplastic resin fibers. In particular, it is preferred to add thermoplastic resin fibers when the carding is performed because breakage of carbon fibers at the carding can be prevented. Because carbon fibers are rigid and fragile, they are hard to be tangled and liable to be broken. Therefore, there is a problem in the carbon fiber aggregate formed by only carbon fibers that during the carding, carbon fibers are easily cut or carbon fibers are liable to fall off. Accordingly, by containing thermoplastic resin fibers which are flexible and easily tangled, a carbon fiber aggregate, in which the carbon fibers are hard to be cut and the carbon fibers are hard to fall off, can be formed.

Further, it is also preferred to perform the carding mixing such organic fibers, in particular, thermoplastic resin fibers after the carding, to perform pressing after melting at least a part of the organic fibers. Namely, it is also preferred that, by mixing an adequately small amount of thermoplastic resin fibers and melting at least a part of the thermoplastic resin fibers at a condition where carbon fibers are treated with a predetermined carding, for example, so that a part of carbon fibers are oriented in a specified direction, a function of a binder for maintaining a predetermined form of a sheet-like base material is given to the thermoplastic resin fibers, and by performing pressing at such a condition, the maintained form is appropriately fixed via the thermoplastic resin fibers.

In a case where thermoplastic resin fibers are contained in a carbon fiber aggregate as described above, the content of carbon fibers in the carbon fiber aggregate is preferably 50 to 95 mass %, more preferably 70 to 95 mass %. If the rate of carbon fibers is low, it becomes difficult to obtain high mechanical properties when a carbon fiber-reinforced plastic is made and, to the contrary, if the rate of thermoplastic resin fibers is too low, the above-described function of the thermoplastic resin fibers when the thermoplastic resin fibers are mixed to the carbon fiber aggregate cannot be expected, or becomes poor.

Further, it is preferred to provide a crimp to the above-described thermoplastic resin fibers to enhance the effect of tangle due to the thermoplastic resin fibers. Although the degree of the crimp is not particularly limited, generally, thermoplastic resin fibers having a number of crimps of approximately 5 to 25 crests per 25 mm and a rate of crimp in a range of approximately 3 to 30% can be used.

The material for such thermoplastic resin fibers is not particularly restricted and it can be appropriately selected from a range that does not greatly reduce the mechanical properties of a carbon fiber-reinforced plastic. For example, fibers can be used which are prepared by spinning a resin such as a polyolefin-group resin such as polyethylene or polypropylene, a polyamide-group resin such as nylon 6 or nylon 6,6, a polyester-group resin such as polyethylene terephthalate or polybutylene terephthalate, a polyetherketone, a polyethersulfone, or an aromatic polyamide. It is preferred that such a material for thermoplastic resin fibers is appropriately selected in accordance with the combination with a matrix resin of a carbon fiber-reinforced plastic. In particular, thermoplastic resin fibers prepared using the same resin as a matrix resin, a resin having a compatibility with a matrix resin or a resin having a high adhesive property with a matrix resin are preferred because the mechanical properties of a carbon fiber-reinforced plastic are not lowered.

Further, a method of pressing, in a case where as described above the carding is carried out at a condition of mixing thermoplastic resin fibers to carbon fibers, and after the carding, the pressing is performed after melting at least a part of the thermoplastic resin fibers, is not particularly restricted and, for example, a usual press machine for pressing at a condition of nipping with a flat plate, a calender roll machine for pressing at a condition of nipping with a pair of rolls and the like can be employed.

Although in the above description the method of making a carbon fiber base material after the treatment of carding has been exemplified, it is also possible to make a carbon fiber base material merely by a paper making method without performing carding. For example, it is also possible to make a sheet-like carbon fiber base material by supplying aggregates of discontinuous carbon fibers 49 cut at a weight average fiber length of 50 mm onto belt conveyer 48 in FIG. 4 and pressing them, for example, with the calender roll machine and the like as described above. In this case, similarly to the above description, it is preferred to mix thermoplastic resin fibers in the carbon fiber aggregates and give the thermoplastic resin fibers a function of a binder to maintain the sheet-like base material form.

Further, by the above-described treatment using a calendar roll machine and the like or a similar treatment, a property of the base material itself, in particular, the aforementioned apparent porosity of the base material at the time of being compressed at 2 MPa or apparent porosity of the base material at the time of being compressed at 10 MPa, can be controlled at a desired property.

Thus, by using a base material made to have a desirable compression property, placing the compressible base material in a mold, heating the mold at a temperature of, for example, 100° C. or higher before placing the base material or after placing the base material, injecting the melted thermoplastic resin into the mold by injection and the like, and compressing the inside of the mold together with the injection or after the injection, even if a complicated shape is molded, a fiber-reinforced plastic having high mechanical properties can be manufactured easily and inexpensively.

Hereinafter, the compression operation due to the reduction of the cavity volume of the mold will be exemplified referring to FIGS. 1 to 3.

Figure 1:
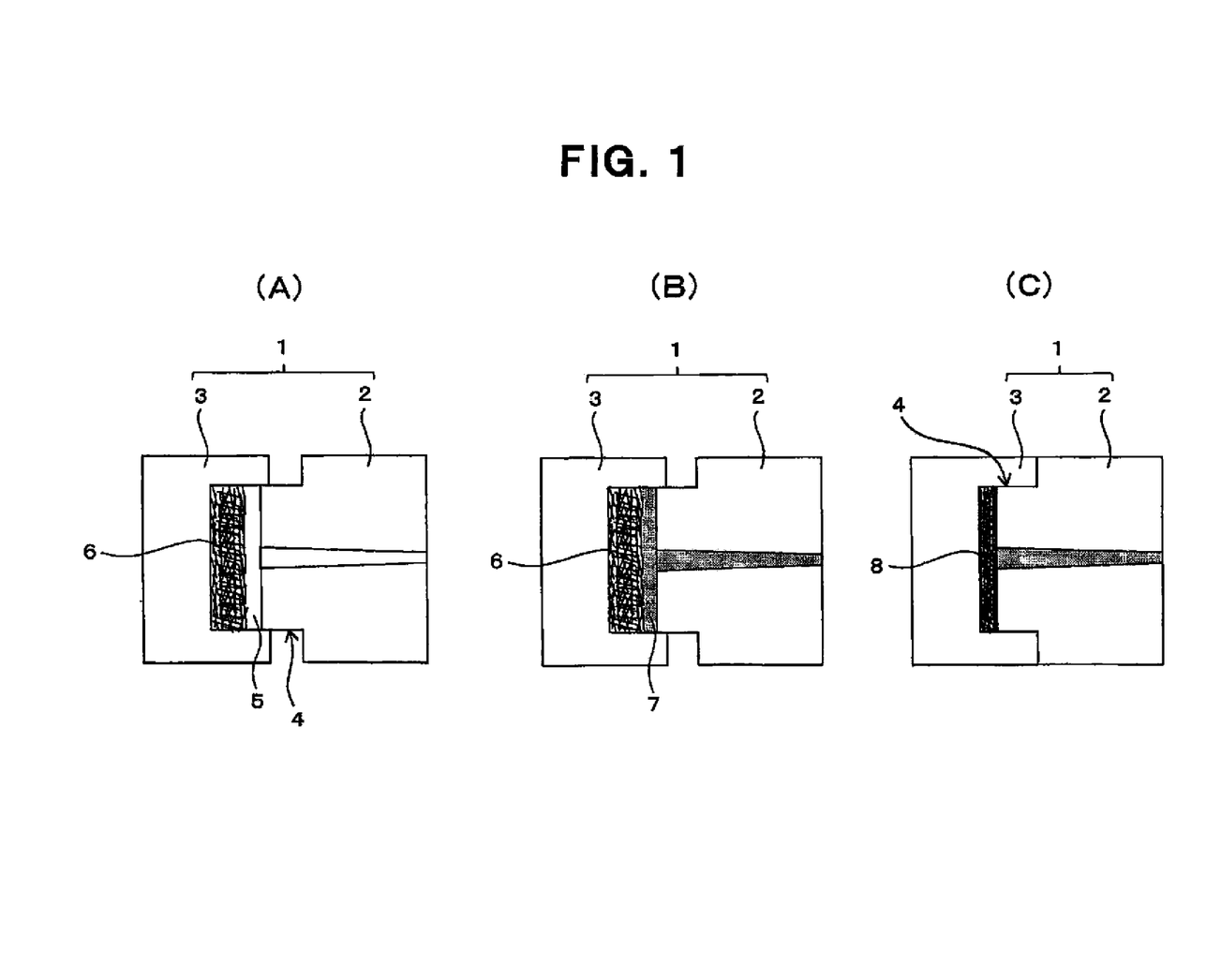
FIG. 1 depicts schematic sectional views of a mold showing respective steps in a method of manufacturing a fiber-reinforced plastic according to an example.

FIG. 1 shows respective steps in a method of manufacturing a fiber-reinforced plastic according to an example. As shown in FIG. 1(A), a mold 1, mold pieces 2, 3 disposed facing each other of which have a fitting structure 4 is used, and a reinforcing fiber base material 6 made as aforementioned and having a relatively low apparent porosity is placed in a cavity 5 of the mold 1 which is in a mold opened condition. At this condition, as shown in FIG. 1(B), for example, through one mold piece 2, melted thermoplastic resin 7 is injected and supplied into cavity 5 by injection. Then, as shown in FIG. 1(C), mold pieces 2, 3 are precisely closed to each other via fitting structure 4, and the volume of the above-described cavity 5 is reduced. By this reduction of the cavity volume, the inside of cavity 5 of mold 1 is compressed, and reinforcing fiber base material 6 after having been or while being impregnated with thermoplastic resin 7 is also compressed. Through this compression, an excellent resin impregnated state suppressed with voids can be obtained as well as a high fiber volume content can be achieved, and a fiber-reinforced plastic 8 having high mechanical properties can be obtained.

Figure 2:
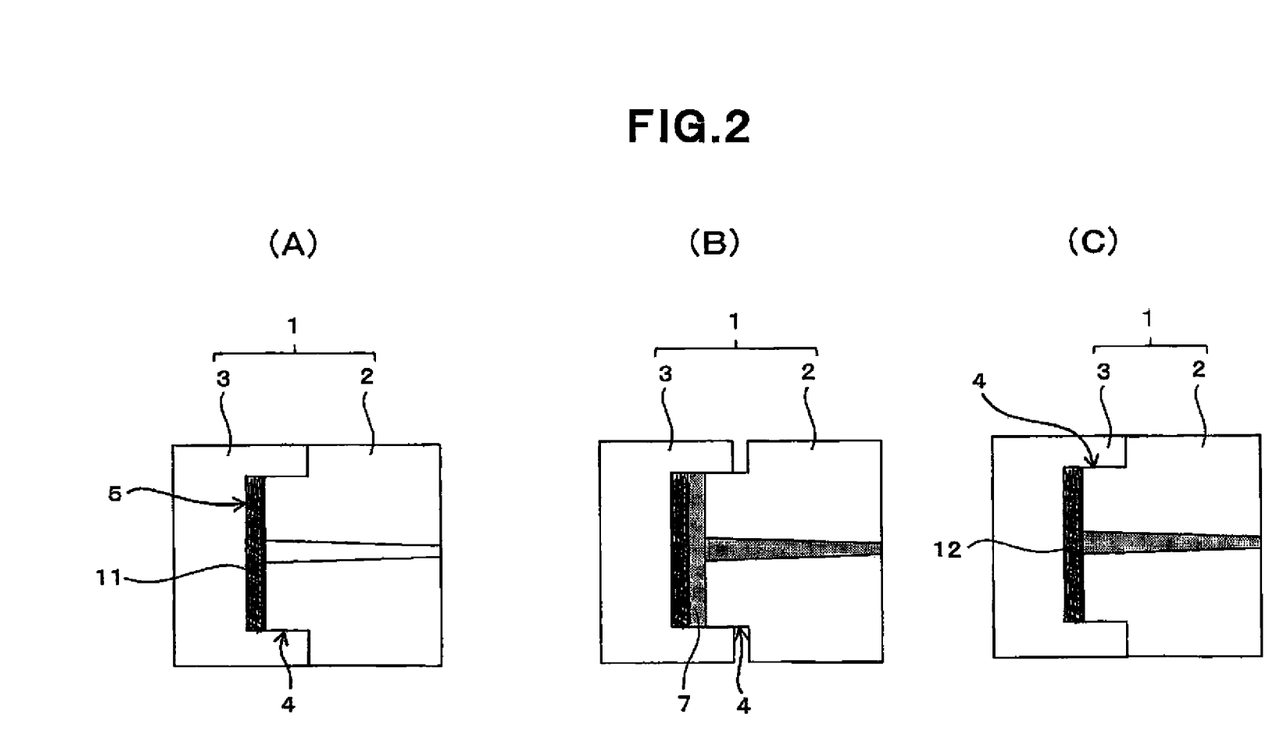
FIG. 2 depicts schematic sectional views of a mold showing respective steps in a method of manufacturing a fiber-reinforced plastic according to another example.

FIG. 2 shows respective steps in a method of manufacturing a fiber-reinforced plastic according to another example. As shown in FIG. 2(A), a mold 1 similar to that in the above-described example, mold pieces 2, 3 disposed facing each other of which have the fitting structure 4 is used, a reinforcing fiber base material 11 is placed in the cavity 5 of the mold, and first the mold is closed. At this step, the base material 11 is not greatly compressed. At this condition, as shown in FIG. 2(B), for example, through one mold piece 2, melted thermoplastic resin 7 is injected and supplied into cavity 5 by injection and, by the resin pressure at the time of the injection, mold pieces 2, 3 are slightly opened to each other precisely via fitting structure 4. The melted thermoplastic resin 7 filled in cavity 5 begins to impregnate into reinforcing fiber base material 11 having a relatively great porosity. Then, as shown in FIG. 2(C), mold pieces 2, 3 are precisely closed to each other via fitting structure 4, and the volume of the above-described cavity 5 is reduced. By reduction of the cavity volume at this stage, the inside of cavity 5 of mold 1 is compressed and reinforcing fiber base material 11 after having been or while being impregnated with thermoplastic resin 7 is also compressed. Through this compression, an excellent resin impregnated state with a suppressed number of voids can be obtained as well as a high fiber volume content can be achieved, and a fiber-reinforced plastic 12 having high mechanical properties can be obtained.

Figure 3:
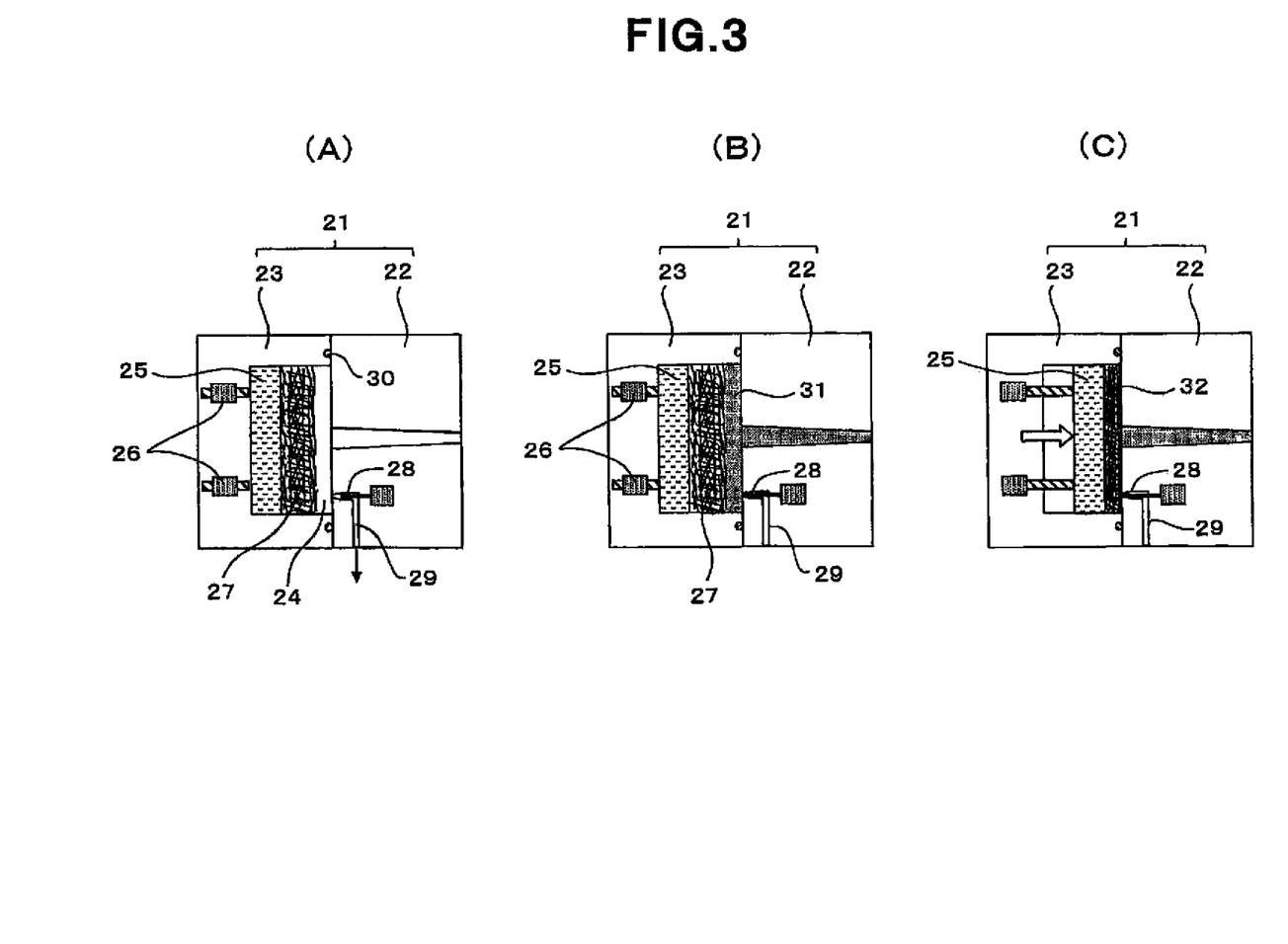
FIG. 3 depicts schematic sectional views of a mold showing respective steps in a method of manufacturing a fiber-reinforced plastic according to a further example.

FIG. 3 shows respective steps in a method of manufacturing a fiber-reinforced plastic according to a further example. As shown in FIG. 3(A), a mold 21, which forms a cavity 24 between mold pieces 22, 23 disposed facing each other, is used. In this cavity 24, a movable core 25 capable of moving in the cavity 24 is provided and the movable core 25 can forcibly move in both directions in the cavity 24 by a driving means 26 provided in one mold piece 23 (for example, a driving means comprising a ball screw). A reinforcing fiber base material 27 made as aforementioned and having a relatively low apparent porosity is placed in the cavity 24 of the mold 21. After placing the reinforcing fiber base material 27, a valve 28 provided in the other mold piece 22 is opened, and the inside of the cavity 24 is reduced in pressure by the suction operation (shown by an arrow) through a suction path 29. At that time, the cavity 24 is sealed from the outside by a seal material 30 disposed between mold pieces 22, 23. At this condition, as shown in FIG. 3(B), for example, through one mold piece 22, melted thermoplastic resin 31 is injected and supplied into cavity 24 by injection. At this time, valve 28 is closed and resin clogging of suction path 29 is avoided. The melted thermoplastic resin 31 filled in cavity 24 begins to impregnate into reinforcing fiber base material 27 having a relatively great porosity. Then, as shown in FIG. 3(C), movable core 25 is forcibly moved in cavity 24 by driving means 26, and the volume of the cavity 24 is reduced. By this reduction of the cavity volume, reinforcing fiber base material 27 after having been or while being impregnated with thermoplastic resin 31 is also compressed. Through this compression, an excellent resin impregnated state suppressed with voids can be obtained as well as a high fiber volume content can be achieved, and a fiber-reinforced plastic 32 having high mechanical properties can be obtained.

INDUSTRIAL APPLICATIONS

Our methods can be applied to manufacturing of any fiber-reinforced plastic a matrix resin of which is basically a thermoplastic resin.

The invention claimed is:

1. A method of manufacturing a fiber-reinforced plastic comprising:
    placing a compressible reinforcing fiber base material made of discontinuous reinforcing fibers in a cavity of a mold;
    injecting melted thermoplastic resin into said cavity; and
    impregnating the resin into said reinforcing fiber base material,
    wherein said mold is adapted to change a cavity volume of said mold, and said reinforcing fiber base material after having been or while being impregnated with said thermoplastic resin is compressed in said cavity by reducing said cavity volume of said mold after injecting said melted thermoplastic resin, and
    wherein, after placing said reinforcing fiber base material in said cavity of said mold and closing said mold, said cavity volume is reduced after said mold is opened by a resin pressure at which said melted thermoplastic resin is injected into said cavity.

2. The method according to claim 1, wherein a compression force at the time of reducing said cavity volume is 10 MPa or more.

3. The method according to claim 1, wherein a mold, mold pieces disposed facing each other of which can be closed and opened via a fitting structure or a movable core; is said mold adapted to change said cavity volume.

4. The method according to claim 1, wherein said cavity volume is reduced after said melted thermoplastic resin is injected at a condition where a pressure in said cavity is reduced.

5. The method according to claim 1, wherein a base material, an apparent porosity of which at the time of being compressed at 2 MPa is 70% or more, is used as said compressible reinforcing fiber base material.

6. The method according to claim 1, wherein a base material, an apparent porosity of which at the time of being compressed at 10 MPa is 40% or less, is used as said compressible reinforcing fiber base material.

7. The method according to claim 1, wherein reinforcing fibers of said reinforcing fiber base material comprise carbon fibers.

8. The method according to claim 7, wherein a weight average fiber length of said carbon fibers contained in said reinforcing fiber base material is 1 mm or more and 100 mm or less.

9. The method according to claim 1, wherein a thermoplastic resin is contained in said reinforcing fiber base material by 3 to 50 wt. %.

10. The method according to claim 1, wherein said reinforcing fiber base material is one made by paper making method.

11. The method according to claim 1, wherein said reinforcing fiber base material is one made by a carding machine.

12. The method according to claim 1, wherein said reinforcing fiber base material is one in which said discontinuous reinforcing fibers are randomly oriented.

13. The method according to claim 1, wherein said reinforcing fiber base material is one in which at least a part of said discontinuous reinforcing fibers are oriented in a specified direction.

14. The method according to claim 13, wherein a ratio of an elastic modulus in said specified direction to an elastic modulus in a direction perpendicular to said specified direction of a fiber-reinforced plastic after molding is 2:1 to 10:1.

15. The method according to claim 1, wherein a molding temperature of said thermoplastic resin is 100° C. or higher.

16. The method according to claim 1, wherein said thermoplastic resin comprises one selected from the group consisting of a polyolefin, a polyamide, a polyester, a polyphenylene sulfide, a polycarbonate, a polyetherketone and a polyetherimide.

17. The method according to claim 1, wherein, as said mold, a mold for injection-compression molding, in which a gas vent is provided to a cavity part positioned at an opposite side relatively to a gate filled with said thermoplastic resin, is used.

18. The method according to claim 1, wherein a base material, in which said compressible reinforcing fiber base material is held in a resin film pack at a pressure reduced condition, is placed in said cavity of said mold.

* * * * *